United States Patent [19]
Bender et al.

[11] Patent Number: 5,519,851
[45] Date of Patent: May 21, 1996

[54] PORTABLE PCMCIA INTERFACE FOR A HOST COMPUTER

[75] Inventors: Michael S. Bender, Boulder Creek, Calif.; Douglas McCallum, Louisville, Colo.; Charles F. Patton, Jr., Dublin; Duong M. Vo, Milpitas, both of Calif.

[73] Assignee: Sun Microsystems, Inc., Mountain View, Calif.

[21] Appl. No.: 213,752

[22] Filed: Mar. 14, 1994

[51] Int. Cl.⁶ .................................................. G06F 13/12
[52] U.S. Cl. ................. 395/500; 364/940.81; 364/238.5; 364/238.4; 364/240.8
[58] Field of Search .................................. 395/500, 700, 395/200, 275

[56] References Cited

U.S. PATENT DOCUMENTS

| | | | |
|---|---|---|---|
| 5,283,889 | 2/1994 | DeLisie | 395/500 |
| 5,305,436 | 4/1994 | Mundkur | 395/162 |
| 5,319,751 | 6/1994 | Garney | 395/200 |
| 5,343,319 | 8/1994 | Moore | 359/152 |
| 5,384,850 | 1/1995 | Anderson | 395/2 |
| 5,396,602 | 3/1995 | Amini et al. | 395/325 |

OTHER PUBLICATIONS

"A spilt model for OS/2 SCSI device drivers", by D. T. Feriozi, IBM Systems Journal, vol. 31, No. 1, 1992 Armonk, New York, U.S., pp. 114–122.

"Eine Sparche zur Generierung von Geratetreibern", by Herter & Plessman, Angewandte Informatik Applied Informatics, vol. 29, No. 8–9, Sep. 1987, Wievadende, pp. 369–378.

CL–PD6710/PD672X Preliminary Data Sheet by Cirrus Logic. Oct. 1993.

82365SL PC Card Interface Controller (PCIC) by Intel. Nov. 1991.

Release dated Feb. 22, 1994, entitled "Sun Brings PCMCIA to SPARC Workstations—Single-Chip Controller Bridges PCMCIA–to–SBus Standards".

*Primary Examiner*—David Y. Eng
*Attorney, Agent, or Firm*—Kang S. Lim

[57] ABSTRACT

A portable PCMCIA interface for a host computer having a system bus. In one embodiment, the host computer is a SPARC based computer having an SBus and running the UNIX operating system. The PCMCIA interface provides a user application with access to a PCMCIA card. In this embodiment, the PCMCIA interface includes software and hardware components. The software component includes a hardware-independent portion and a hardware-dependent portion. By implementing the software in a suitable high level language such as "C", the software can be easily ported to other hardware platforms by merely adapting the hardware-dependent portion. The hardware component includes an ASIC coupled between the system bus and a couple of PCMCIA sockets. In some embodiments, the hardware also includes a 5 volt to 12 volt DC—DC converter between the system bus and the PCMCIA sockets.

13 Claims, 15 Drawing Sheets

PORTABLE PCMCIA INTERFACE FOR A HOST COMPUTER

FIELD OF THE INVENTION

This invention relates to an interface between a host computer and a peripheral device. More particularly, the invention relates to an interface between the host computer and a Personal Computer Memory Card International Association (PCMCIA) peripheral card.

DESCRIPTION OF THE RELATED ART

FIG. 1A is a block diagram showing the hardware components of a conventional non x86 based host computer, such as a scalable processor architecture (SPARC) host computer. (SPARC® is a registered trademark of SPARC International, Inc.) Host computer 10 includes a host central processor unit (CPU) 20, a memory bus (M-bus) 35, a host memory 30, a host bus controller 50, a standardized host system bus 55 and input/output (I/O) devices such as a monitor/keyboard/mouse 41 and a hard disk drive 42. System bus 55 interconnects and provides communication between CPU 20 and I/O devices 41, 42. In some host computers, system bus 55 is a SPARC based SBus.

FIG. 1B illustrates the software components of the host computer of FIG. 1A. A UNIX user application 31 is coupled to a UNIX operating system (O/S) 130 having a kernel 32 and hardware-dependent drivers 33, and system bus 55. (UNIX® is a registered trademark of UNIX System Laboratories, Inc., a wholly-owned subsidiary of Novell, Inc.) System bus 55 is coupled to I/O devices 41, 42. Typically, when host computer 10 is first initialized, UNIX O/S 130 is loaded into host memory 30 and remains resident until computer 10 is powered down. Consequently, I/O device drivers 33 corresponding to I/O devices 41, 42 are loaded and user application 31 has access to I/O devices 41, 42 by making the appropriate calls to kernel 32 which communicates the access via device drivers 33, system bus 55 to I/O devices 41, 42.

The increase in the processing power of computers such as host computer 10 has caused a corresponding increase in the complexity of user applications such as application 31. As a result, there is an increasing need for additional memory, mass storage and communication devices, the most convenient form being an external device coupled to system bus 55. Typically, adding external memory or mass-storage devices to host computer 10 involves the insertion of an adapter in the form of a printed circuit board (PCB) into an available system bus slot located inside the housing of computer 10. When inserted into the system bus slot, the PCB is electrically coupled to system bus 55 and the adapter is therefore capable of communicating with host CPU 20. Hence, the maximum number of external devices that can be coupled to host computer 10 is limited by the total number of system bus slots available within computer 10. Further, a typical non-technical user is not trained to insert or remove PCBs, and a trained technician or service person is required to make such an upgrade or change.

Meanwhile, in a different hardware arena of computers based on Intel's x86 family of microprocessors, such as the IBM personal computer, a PCMCIA specification was developed to promote both compatibility and interoperability for adding external devices. (Intel® is a registered trademark of Intel Corporation and IBM® is a registered trademark of International Business Machines Corporation.) Typically a PCMCIA adapter provides standardized PCMCIA socket(s) for plugging in PCMCIA cards (PC cards), and is controlled by associated interface software running on the host computer. Hence, it is now possible for an end user to easily insert and interchange a wide variety of external peripheral and memory devices implemented in the PC card format into an x86-based host computer on demand.

Initially, the x86-based PCMCIA interface was designed for relatively fast random access memory (RAM) cards and hence the specified read/write protocol between the adapter and the x86-based host computer is similar to that necessary for a memory-type access operation. PC cards with memory include RAM PC cards and hard disk drive PC cards. More recently, the PCMCIA specification was extended to accommodate PC cards requiting I/O type data access protocol, such as FAX modem cards.

FIG. 2 is a block diagram showing both the software and hardware components of one such prior art x86-based host computer having a PCMCIA interface specifically designed for an x86-based computer system bus, such as an ISA or VESA bus. The software component includes user application 141, Microsoft's disk operating system (DOS) 142 and an x86-based hardware-dependent PCMCIA software driver 143. (Microsoft® is a registered trademark of Microsoft Corporation.) The hardware component includes an x86-based system bus 145 and an x86-based PCMCIA adapter 146 having a pair of PCMCIA sockets 147a, 147b for housing a corresponding pair of PC cards 110, 120. Two examples of prior art integrated circuits (ICs) for the x86 based PCMCIA adapter are Intel's 82365SL PC card interface controller and Cirrus Logic's CL-PD6710/20.

User application 141 accesses PC card 110 or 120 by fast making a standardized system call to DOS 142. Next, DOS 142 makes the appropriate PCMCIA call to x86-based PCMCIA software driver 143 in order to communicate the access across x86-based system bus 145 to PCMCIA adapter 146. Upon receiving the access request over bus 145, adapter 146 translates the system bus signals into standardized PCMCIA signals for PC card 110 or 120.

One problem associated with the conventional PCMCIA interface is that the PCMCIA specification was originally developed for computers based on Intel's x86 family of microprocessors running operating systems such as DOS, MS-Windows or OS/2. (MS-Windows™ is a trademark of Microsoft Corporation.) Consequently, the PCMCIA specification was optimized for software drivers which are coded in whole or part in an x86 assembler language which cannot be easily ported to non-x86-based computer systems.

Another problem with most conventional operating systems, such as UNIX and DOS, is that they are not designed to arbitrarily allow hardware devices to be connected and disconnected at random-while the host computer is operating. Traditionally, at system boot time each device driver is polled once to determine if the corresponding hardware device is present. If the device has been disconnected or is non-functional, the device driver is either unloaded from the host computer memory, or if left in the memory, the driver is never used. This particular conventional operating system characteristic prevents PC cards from being safely "hot-plugged", i.e., the practice of inserting or removing PC cards from a PCMCIA socket while the host computer is operating.

Hence, there is a need for a portable PCMCIA interface which fully supports the software and hardware PCMCIA specification and is independent of the host computer's bus architecture, processor or operating system. Such a portable PCMCIA interface will enable other host computers based on hardware architectures such as SPARC, and operating systems such as UNIX, to utilize the growing bank of standardized PC cards, while fully supporting the PCMCIA features such as hot-plugging.

SUMMARY OF THE INVENTION

The present invention provides a portable PCMCIA interface operational on many host computer architectures to couple a user application to a PC card.

In one embodiment, the user application runs in a host computer having a host system bus. The PCMCIA interface includes both software and hardware components. The PCMCIA interface software includes a hardware-independent portion and a hardware-dependent portion, with a defined external interface between the user application and the hardware-independent portion. The external PCMCIA software interface provides PCMCIA Card Services and Socket Services to the user application in a manner transparent to the underlying hardware, e.g., the PC card. In addition, there is a defined internal interface between the hardware-independent and hardware-dependent portions of the PCMCIA interface software, enabling the entire PCMCIA interface to be easily ported to other host computers by merely adapting the hardware-dependent portion.

The PCMCIA interface hardware includes a PCMCIA adapter coupled to the system bus, the adapter having at least one PCMCIA socket for accommodating the PC card. The user application initiates all data transfers to and from the PC card, as dictated by the PCMCIA specification. The host system bus compatible PCMCIA adapter supports 8 bit, 16 bit and 32 bit data transfers to and from attribute memory space, common memory space and I/O space of the PC card.

In some embodiments, the addition of power switching circuitry between the system bus power supply and PCMCIA socket(s) of the PCMCIA adapter enables the PC card(s) to be safely inserted in and removed from the PCMCIA socket(s) without the need for powering down the host computer. An optional 5 volt to 12 volt DC—DC converter provides additional compatibility for PC cards requiring a 12 volt supply.

The PCMCIA interface of the present invention has a number of advantages over the prior art. By providing a defined internal interface between the hardware-independent and hardware-dependent portions of the PCMCIA interface software, the specific characteristics of the system bus, the adapter and the PC card become transparent to the user application software running on the host computer. In addition, by implementing the software in a high level programming language, the entire PCMCIA interface software can be ported to other host computers having different operating systems and hardware architectures by merely adapting the hardware-dependent portion. Accordingly, the PCMCIA interface of the present invention provides a hardware and software solution which can be easily ported to other host computers.

DESCRIPTION OF THE DRAWINGS

The objects, features and advantages of the system of the present invention will be apparent from the following description in which.

DESCRIPTION OF THE PREFERRED EMBODIMENT

Figure 1A:
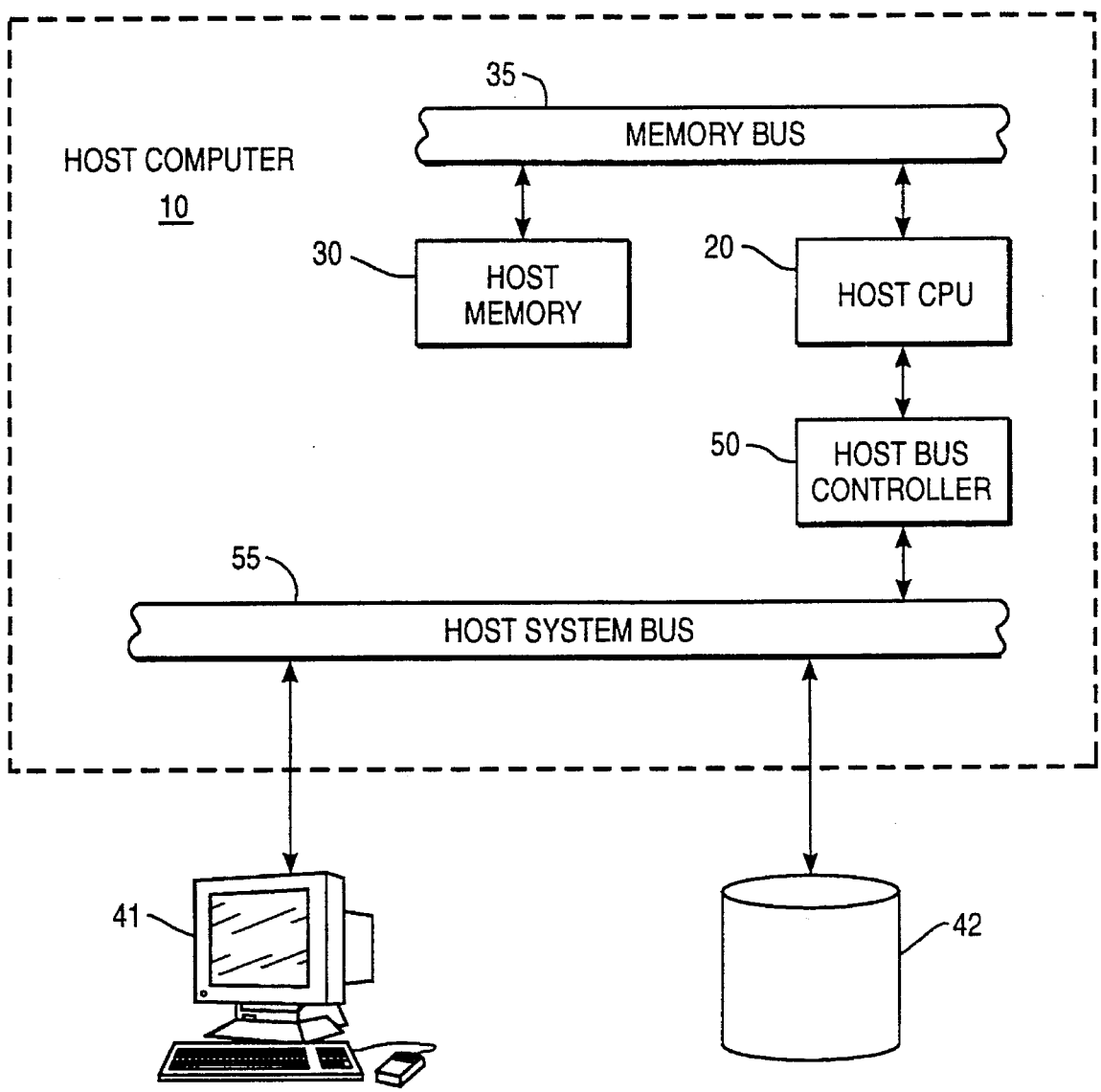
FIG. 1A illustrates the hardware components of a conventional SPARC host computer.
Figure 1B:
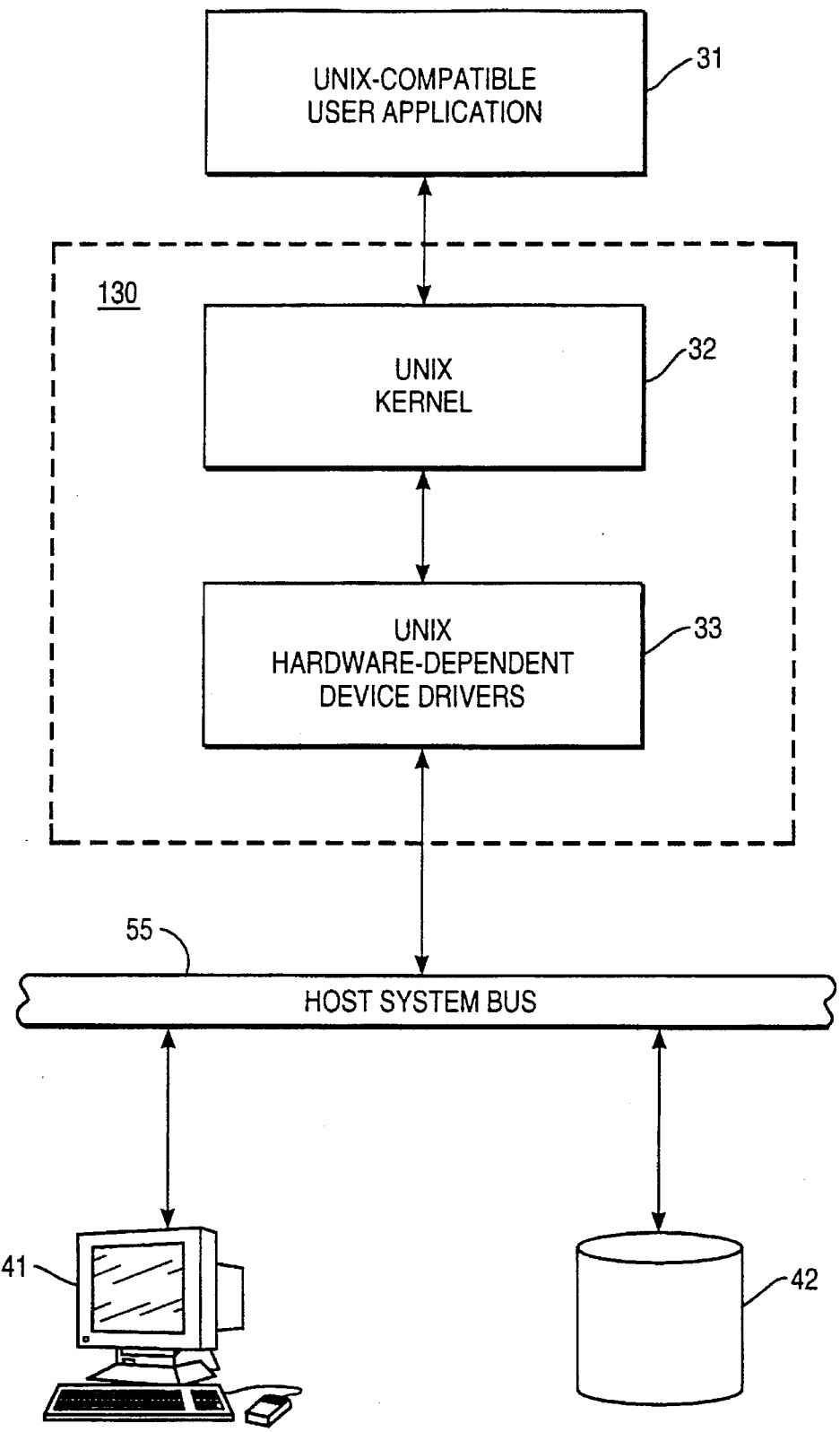
FIG. 1B illustrates the software components of the host computer of FIG. 1A.
Figure 2:
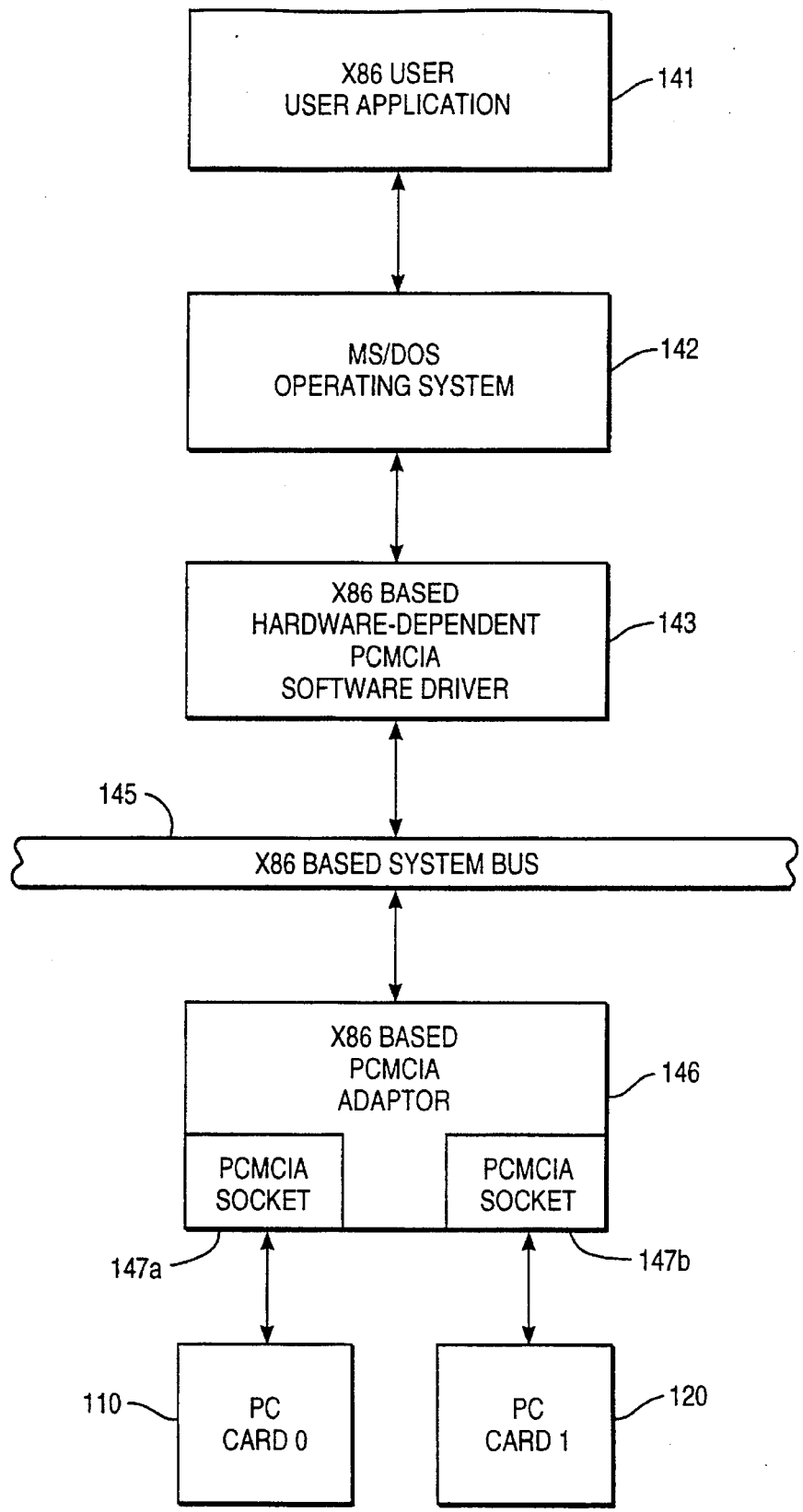
FIG. 2 illustrates a prior art x86-based host computer having a PCMCIA interface.
Figure 3A:
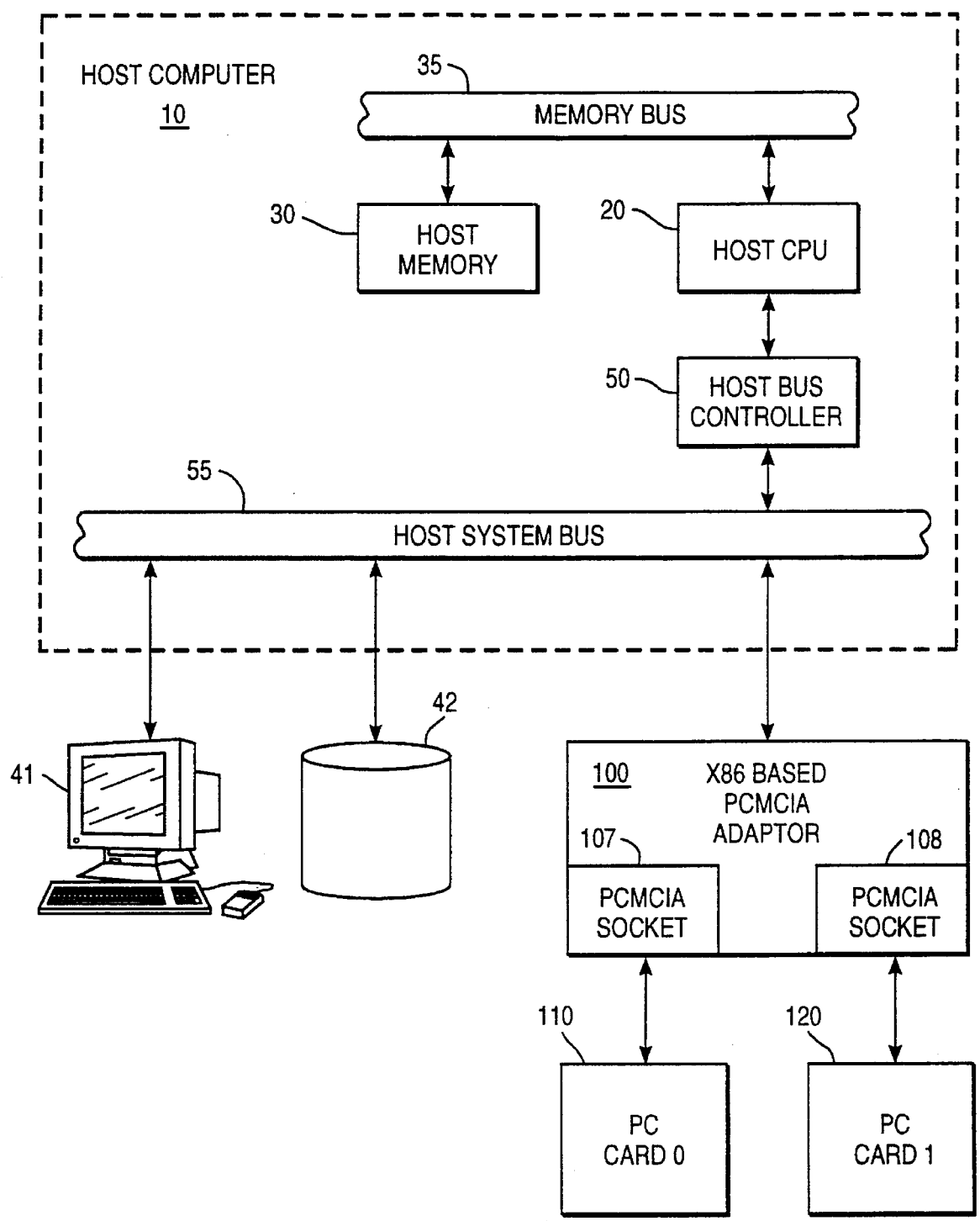
FIG. 3A illustrates a PCMCIA interface coupled to a host computer in accordance with one embodiment of the present invention.

In FIG. 3A, a scalable processor architecture (SPARC) based host computer coupled to a PCMCIA adapter of the present invention is shown. For more information on the SPARC computer architecture, see the SPARC Architecture Manual, Version 8, 1992, available from SPARC International, Menlo Park, Calif. As the operation of SPARC-based host computer 10 is well known, a detailed description is not provided herein.

In accordance with one embodiment of the invention, host computer 10 is coupled to a PCMCIA adapter 100 via system bus 55. Adapter 100 has a pair of PCMCIA sockets 107, 108 for housing a corresponding pair of PC cards 110, 120. PC cards 110, 120 are inserted into adapter 100 via a corresponding pair of 68-pin connectors located within PCMCIA sockets 107, 108.

It should be noted that adapter 100 may assume a variety of physical configurations. For example, in one embodiment for a desktop computer, adapter 100 includes an application specific integrated circuit (ASIC) mounted on a peripheral printed circuit board (PCB), with the PCB occupying a physical slot in system bus 55. An electrical cable interconnects the ASIC to PCMCIA sockets 107, 108. In another embodiment for a palm-top computer, adapter 100 includes an ASIC which resides, together with CPU 20 on a main PCB. An electrical cable interconnects the ASIC to PCMCIA sockets 107, 108 which are attached to the palm-top computer housing. Alternatively, PCMCIA sockets 107, 108 are mounted together with the ASIC and CPU 20 on the main PCB of the desktop or lap top computer, thereby eliminating the need for an interconnecting electrical cable. Other embodiments and variations are also possible and will be apparent to one skilled in the art in view of this disclosure.

For the purpose of describing the operation of a PCMCIA interface software driver running on host computer 10 and controlling PCMCIA adapter 100, reference is made mainly to PC card 110 and its associated hardware and software drivers. Since both PC Cards 110, 120 are electrically and physically coupled to PCMCIA sockets 107, 108, respectively, the description of the operation of the software driver and adapter 100 with respect to first PC card 110 is equally applicable to second PC card 120.

Figure 3B:
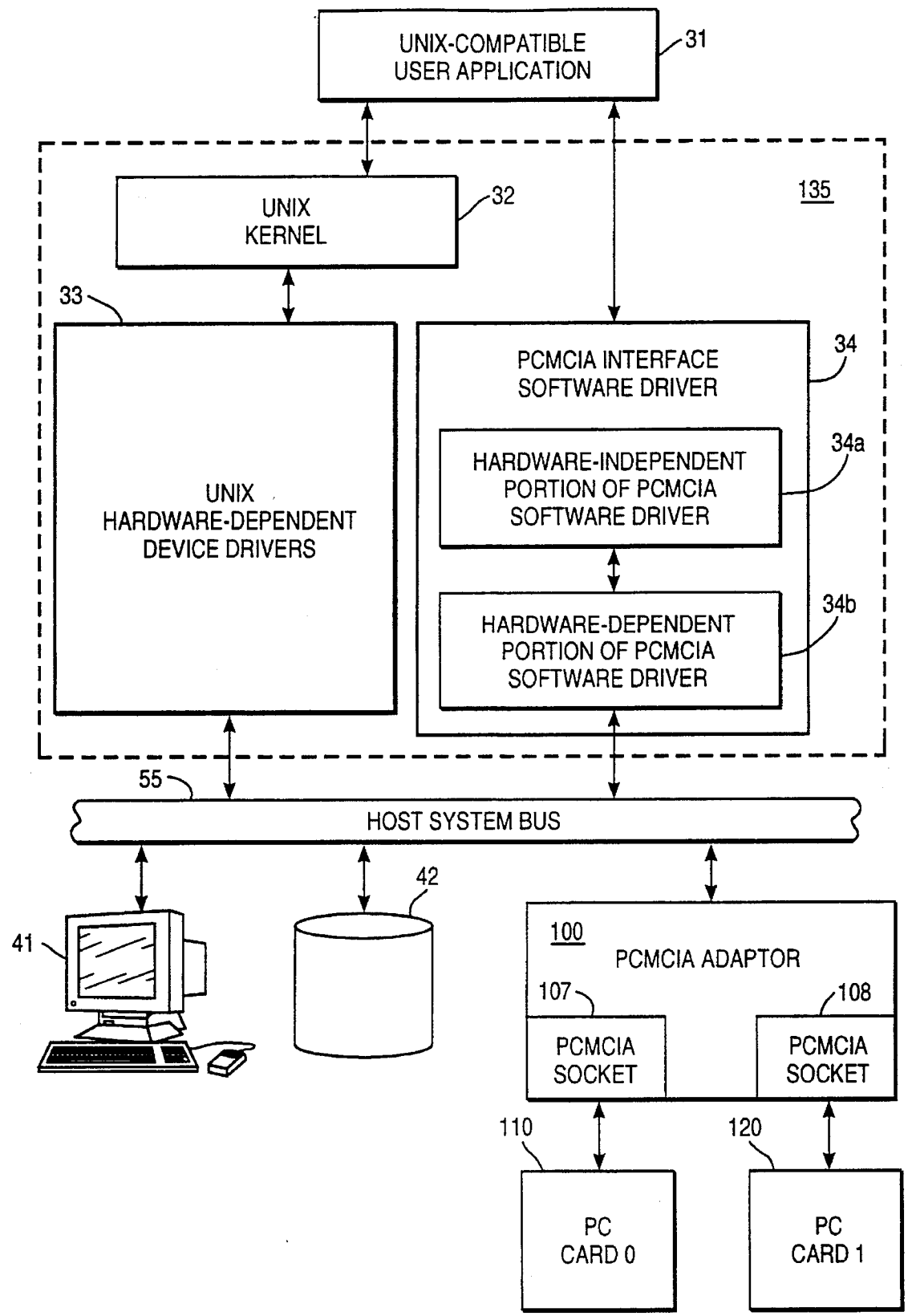
FIG. 3B illustrates the PCMCIA interface software running on the host computer of FIG. 3A.

In this embodiment, as illustrated by the block diagram of FIG. 3B, an UNIX operating system 135 which includes UNIX kernel 32 and device drivers 33, also includes a PCMCIA interface software driver 34. A UNIX compatible user application 31 accesses PC card 110 via PCMCIA interface software driver 34, system bus 55 and adapter 100. Software driver 34 includes a hardware-independent portion 34a and a hardware-dependent portion 34b.

Interface software driver 34 is coded in a suitable high level programming language, such as the "C" language, enabling source code of driver 34 to be easily ported to other host computer platforms by merely making source code changes to hardware-dependent portion 34b and recompiling driver 34. Examples of other possible host computer configurations include the UNIX operating system on an x86 microprocessor based computer. Other variations and modifications of host computer platforms are apparent to one skilled in the art.

Figure 4:
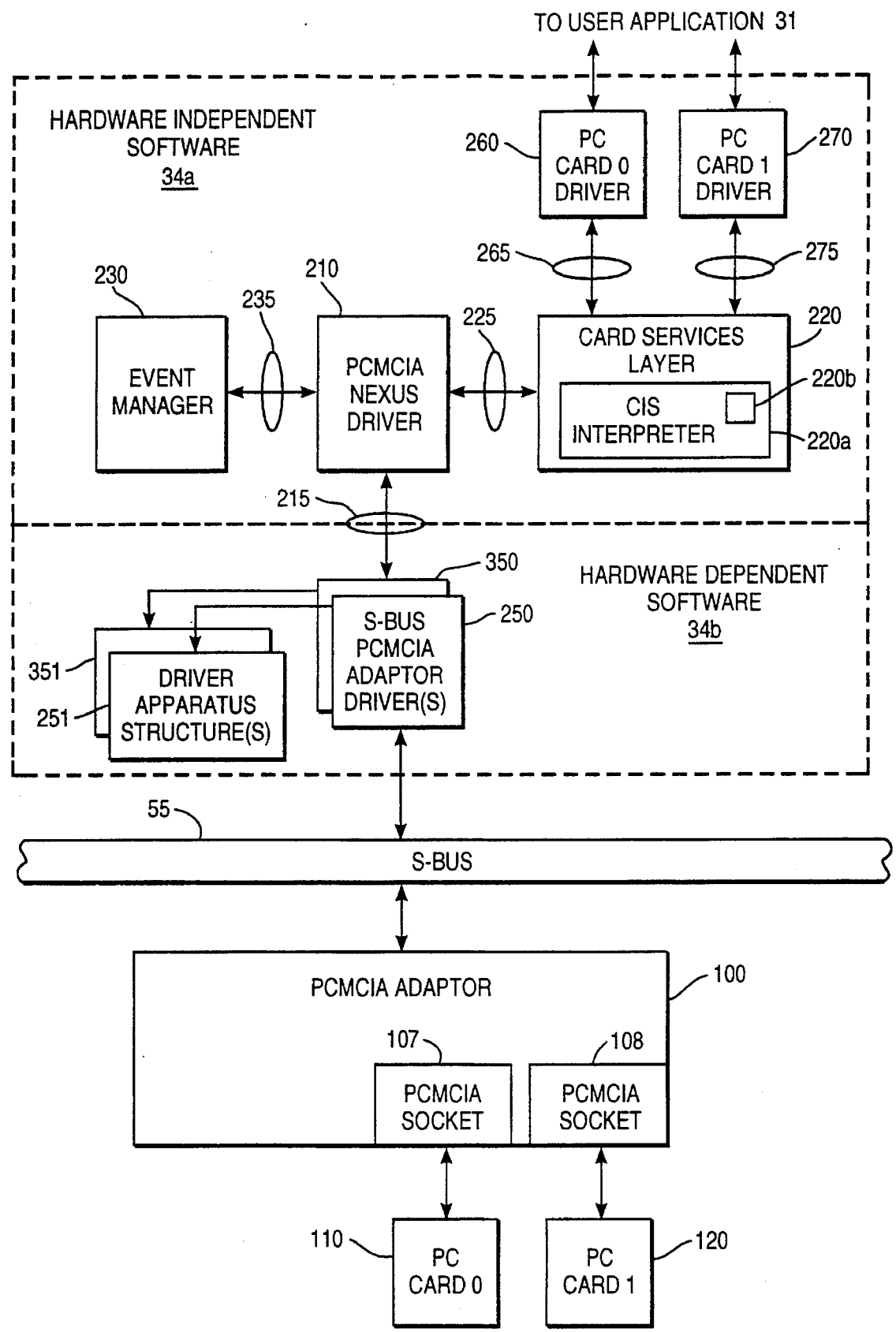
FIG. 4 is a block diagram showing the PCMCIA interface software in greater detail.

FIG. 4 is a block diagram showing PCMCIA interface software driver 34 in greater detail. Hardware-independent portion 34a includes a pair of PC card drivers 260, 270, a PCMCIA nexus driver 210, an event manager 230 and a Card Services layer 220. Hardware-dependent portion 34b comprises a system bus compatible PCMCIA adapter driver 250 for controlling adapter 100. By clearly defining an internal interface 215 between hardware-independent nexus driver 210 and hardware-dependent system bus compatible adapter driver 250, in accordance with one aspect of the invention, the entire PCMCIA interface can advantageously be ported to different host computer platforms by merely adapting hardware-dependent portion 34b of interface software driver 34.

Before user application 31 can begin accessing PC card 110, PCMCIA interface software driver 34 must first be loaded into host memory 30. Loading of the various portions of software driver 34 is accomplished during initialization of host computer 10. When PCMCIA nexus driver 210 is first loaded, nexus driver 210 searches through a list of all possible adapter drivers stored in a configuration file, and attempts to load each adapter driver into the configuration file. For each successful load of a specific adapter driver, e.g., adapter driver 250, nexus driver 210 locates a corresponding driver apparatus structure, e.g. structure 251, associated with each adapter, e.g., adapter driver 250. Adapter driver 250 then saves a pointer to the corresponding driver apparatus structure 251.

Next, PCMCIA nexus driver 210 queries PCMCIA adapter driver 250 to obtain its basic adapter characteristics and adds PCMCIA sockets 107, 108 to the list of available logical sockets. Nexus driver 210 then exports the logical socket list to Card Services layer 220. Consequently, Card Services layer 220 has access to a hardware-independent software interface 215 located between nexus driver 210 and adapter driver 250, enabling Card Services layer 220 to control and manage the resources of adapter 100 and PCMCIA socket 107 in a hardware-independent manner. Nexus driver 210 also exports the same logical socket list to adapter driver 250 thereby establishing a one-to-one logical socket communication channel between Card Services layer 220 and adapter driver 250.

Card Services layer 220 also includes a Card Information Structure (CIS) interpreter 220a which enables PC card 110 to be self identifying independent of the host computer architecture and operating system, by requiring PC card 110 to maintain self-identifying information in its CIS. The CIS is stored in an Attribute Memory space of PC card 110 and is made up of a singly-linked list of variable-length elements called tuples. Interpreter 220a is a tuple parser which is responsible for processing all of the tuple information. As such, PC card driver 260 does not need any tuple parsing code.

In this embodiment, each tuple is one byte in length, with up to 256 distinct tuples stored in the CIS of PC card 110. When a tuple is parsed and recognized by interpreter 220a, interpreter 220a causes the tuple data from PC card 110 to be copied into a tuple entry in an interpreter linked list 220b. Conversely, when interpreter 220a does not recognize the tuple, a flag is set indicating that the tuple was not recognized and that tuple data from PC card 110 should not be copied into a tuple entry in interpreter linked list 220b. Upon the successful parsing of the CIS of PC card 110, linked list 220b contains the configuration parameters of PC card 110, e.g., type of PC card, memory capacity and access speed. Subsequently, Card Services layer 220 uses linked list 220b for processing card service requests from PC card driver 260.

In some embodiments, PCMCIA nexus driver 210 does not export its private interface 215 with adapter driver 250 to PC card driver 260. Interface 225 between Card Services layer 220 and PCMCIA nexus driver 210 is also private, e.g., PC card driver 260 does not make direct calls to PCMCIA nexus driver 210. Instead, whenever user application 31 accesses PC card 110, all calls to PC card driver 260 destined for PCMCIA nexus driver 210 are serviced through Card Services layer 220. As such, Card Services layer 220 provides PC card driver 260 a single entry point with a variable argument list based on the function requested.

Next, in order to support a PCMCIA specified event callback feature, event manager 230 is loaded as a separate STREAMS, enabling nexus driver 210 to communicate PCMCIA events, such as PC card insertion/removal (hot-plugging), to user application 31. (A STREAMS is a UNIX full-duplex connection between a process and a device driver). Hence, nexus driver 210 is provided an efficient event callback mechanism to user application 31, with event manager 230 observing the events and managing both adapter 100 and PC card 110 via adapter driver 250. Event manager 230 is an efficient solution because the number of PC cards available make it unwieldy and inefficient for user application 31 to poll for every possible PCMCIA card. More importantly, event manager 230 typically provides the sole mechanism (generally unsupported by UNIX) for implementing the PCMCIA specified channel for unsolicited feedback to user application 31.

For example, when PC card 110 has been successfully inserted into PCMCIA socket 107, nexus driver 210 receives a "card insertion" event notification from adapter driver 250, enabling nexus driver 210 to keep track of which type of PC card is present in socket 107. Subsequently, a corresponding PC card driver, e.g., driver 260, is loaded and nexus driver 210 updates the corresponding driver apparatus structure, e.g., structure 251, thereby forming an association between PCMCIA socket 107 and PC card 110. A discussion of the PCMCIA interface hardware for supporting this event callback feature is included in a detailed hardware description of adapter 100 below.

Figure 5:
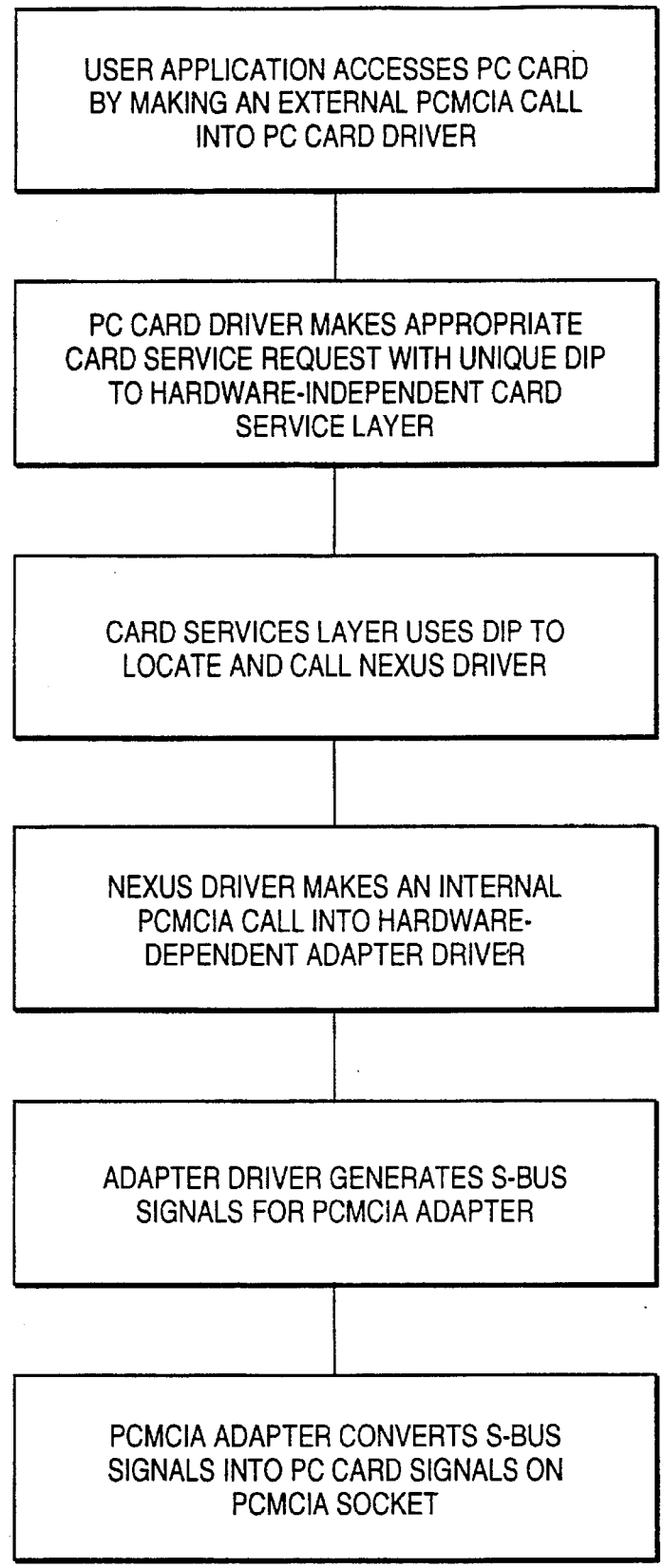
FIG. 5 is a flow chart illustrating an access of a PC card by a user application running on the host computer.

Once the loading and initialization of PCMCIA interface software driver 34 are completed, user application 31 has access to adapter 100 and PC card 110. FIG. 5 is a flow chart illustrating an access of PC card 110 by user application 31 running on host computer 10 in accordance with one embodiment of the invention.

First, user application 31 makes an external hardware-independent PCMCIA call to PC card driver 260. Card driver 260 responds by requesting an appropriate card service from Card Services 220. Card Services 220 is responsible for processing all card services requests from PC card driver 260 and making the appropriate calls into PCMCIA nexus driver 210. PC card driver 260 provides Card Services 220 with a pointer to PC card driver's device information pointer (DIP) thereby uniquely identifying PC card 110 and providing a path to PC card driver 260's parent process, i.e., nexus driver 210. Card Services layer 220 then uses the DIP to locate and to make the appropriate calls into nexus driver 210. Such calls include adapter hardware configuration requests destined for socket services provided by adapter driver 250.

In response to the appropriate calls from Card Services layer 220, nexus driver 210 generates corresponding internal hardware-independent software calls to PCMCIA adapter driver 250. (For additional information on PC Card Services, please refer to Appendix A, which is incorporated herein.) Hardware-dependent adapter driver 250 then converts the internal software calls into appropriate system bus signals for adapter 100. Adapter 100 in turn generates the appropriate PCMCIA card signals for PC card 110 located in PCMCIA socket 107.

In sum, user application 31 initiates data accesses with PC card 110 by communicating the request in the form of a hardware-independent external PCMCIA call to PCMCIA interface software driver 34. In turn, software driver 34, resident on host memory 30, receives the external PCMCIA call and causes the appropriate-dependent adapter specific signals to be asserted on system bus 55. Hence, having described the operation and services provided by the various portions of interface software driver 34 in converting an access request from user application 31 into the appropriate system bus signals, the operation of the PCMCIA interface hardware, i.e., adapter 100 and PC card 110 is now described in detail.

Figure 6:
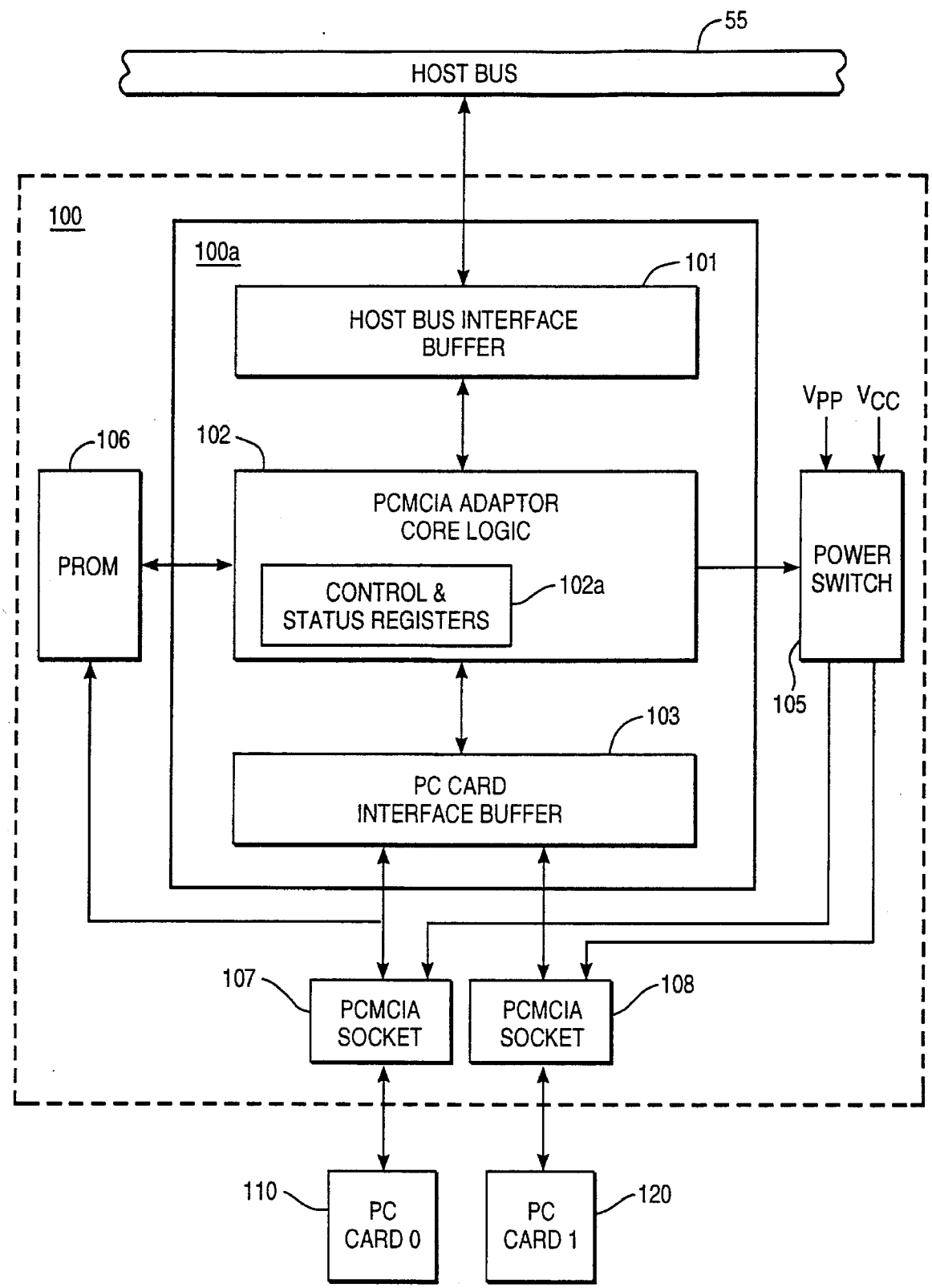
FIG. 6 illustrates a PCMCIA hardware adapter of the present invention.

In one embodiment as illustrated by FIG. 6, PCMCIA adapter 100 includes an application specific IC (ASIC) 100a having a host bus interface buffer 101, an adapter core logic 102, and a card interface buffer 103. Adapter 100 also includes a power switch 105, a PROM 106, and a pair of PCMCIA sockets 107, 108. PROM 106 is an open boot PROM (OBP) which provides standard boot ROM functionality for host computer 10.

Figure 7:
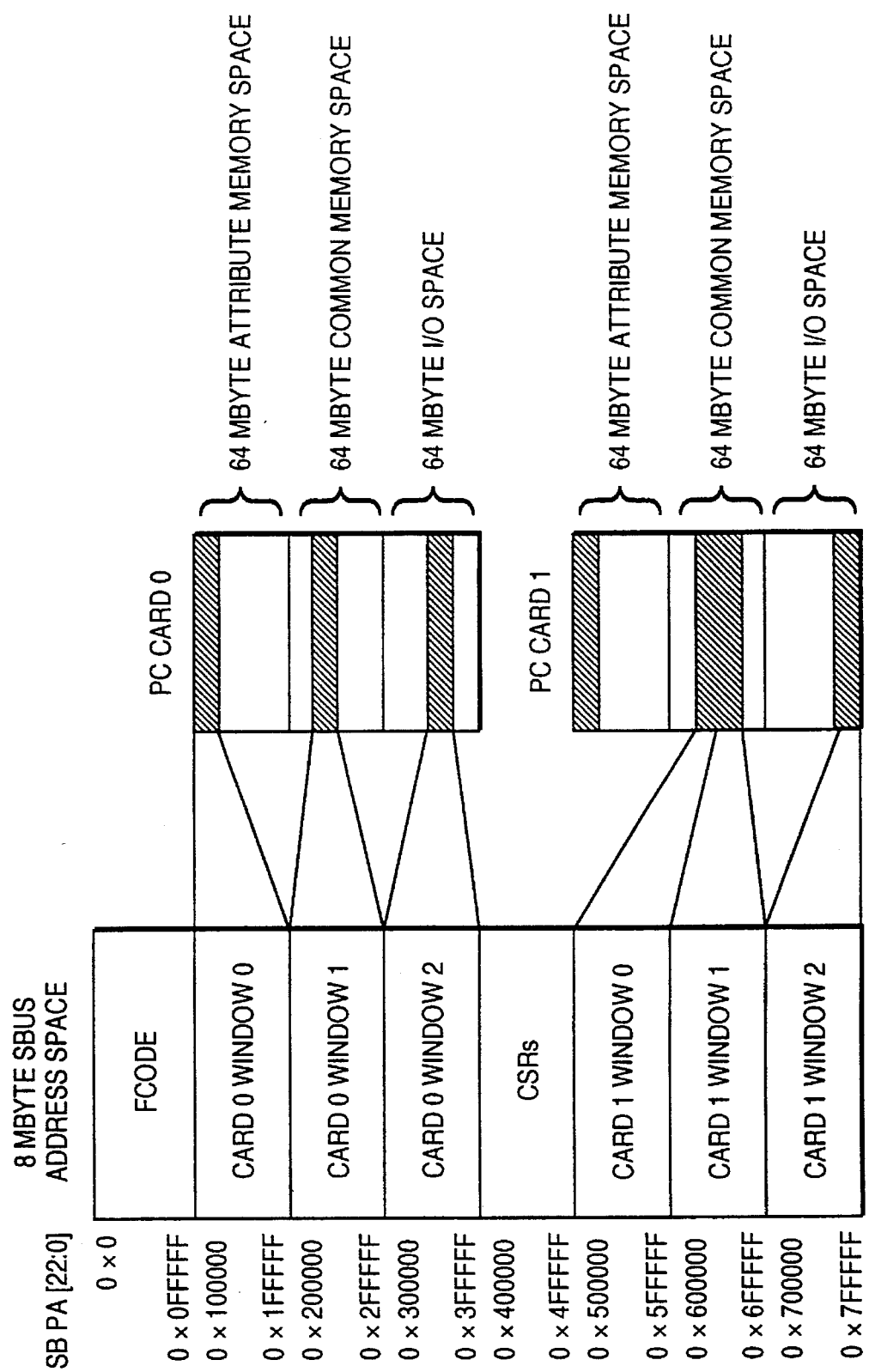
FIG. 7 is an address map showing the SBus address space of the host computer allocated to PC cards.

FIG. 7 is an address map showing three megabytes of the system bus address space in host memory 30 allocated to each of PC cards 110, 120, i.e., a six megabytes of address space is dedicated to PC cards 110, 120.

In this embodiment, address space 0 to FFFFFh and 3FFFFFh to 4FFFFFh of memory 30, are reserved for accessing PROM 106, and the content of control and status registers (CSRs) 102a, respectively. The PCMCIA specification also supports up to 64 megabytes each for attribute memory, common memory and I/O memory space. However, in the described embodiment of PC card 110 only one megabyte of system bus address space each is reserved for attribute memory, common memory and I/O address space. As such, address mapping is required for transposing the system bus address space within specified PCMCIA address space. The address map for the 8 megabyte address space of adapter 100 is stored in PROM 106.

CSRs 102a are used to store parameters for configuring adapter 100 to operate with various type of PC cards. In addition, CSRs 102a also contain the address offset tables necessary for mapping each of the one megabyte system bus address spaces within each of the 64 megabyte PC card address space. These address offset table values can be modified by host computer 10 to suit a particular PC card, e.g., a FAX modem card, a RAM memory card, or a Winchester disk drive card. Configuration parameters stored in CSRs 102a include the data access speed of PC card 110 which can vary a great deal depending on the card function, ranging from a relatively slow modem card to a relatively fast RAM card.

Figure 8A:
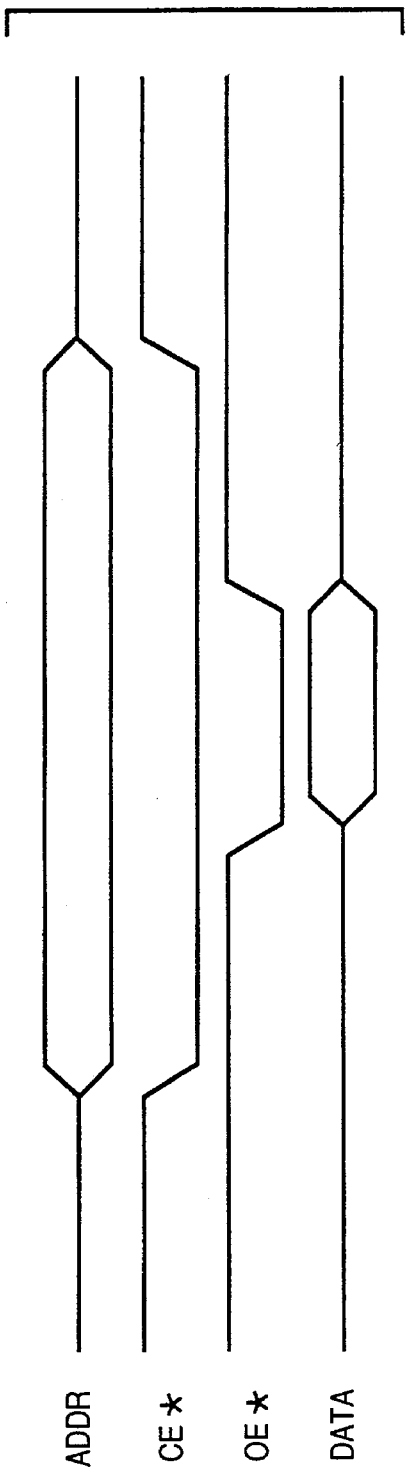
FIGS. 8($a$) and 8($b$) are two timing diagrams illustrating conventional PCMCIA read and write access cycles.
Figure 8B:
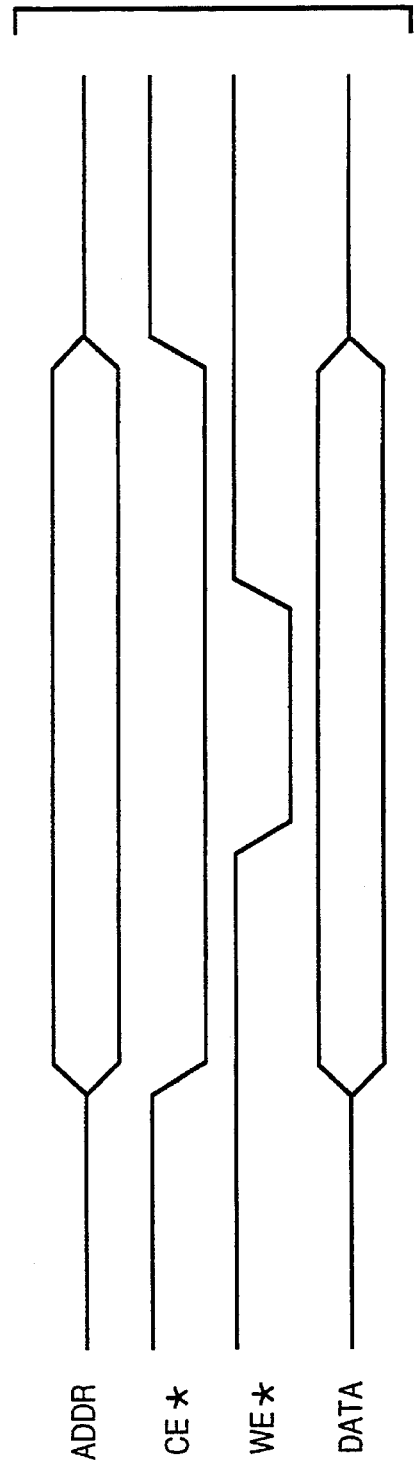

FIGS. 8(a) and 8(b) show two basic timing diagrams illustrating conventional PCMCIA read and write access cycles on system bus 55 in response to read and write accesses of PC card 110 by user application 31. Note that data transfers are initiated by user application 31 as defined by the PCMCIA specification Version 2.1. For example, in response to a read access of PC card 110, adapter 100 asserts card address lines ADDR and card enable line CE* of PCMCIA socket 107. Adapter 100 then asserts the output enable signal OE*, indicating a read access of PC card 110 at the location indicated by card address lines ADDR. After a specific period of time (i.e., PC card read access time), PC card 110 drives the requested data onto card data lines DATA. Similarly, in response to a write access of PC card 110, adapter 100 asserts card data lines DATA, card address lines ADDR and card enable line CE*, followed by the assertion of card write enable line WE.

*Signal is active low.

In accordance with one embodiment of the invention, adapter 100 supports byte, halfword (16-bit) and word (32-bit) data accesses of PC card 110. Since PCMCIA socket 107 can only support 16-bit data transfers, any sizing is performed external to PC card 110. Although the described embodiment of adapter 100 does not perform any data packing (i.e., adapter 100 does not generate multiple read accesses to card 110 in response to a single system bus read request), one skilled in the art will be able to extend the principles of operation to other embodiments of adapter 100 that supports data accesses of word lengths greater than 16-bits without the need for external sizing by host computer 10.

In addition, when an access is initiated at an attribute memory space or at an I/O address space of card 110, card memory select line C0_REG* is asserted low. Conversely, when an access is initiated at a common memory space, card memory select line C0_REG* is asserted high.

*Signal is active low.

Figure 9:
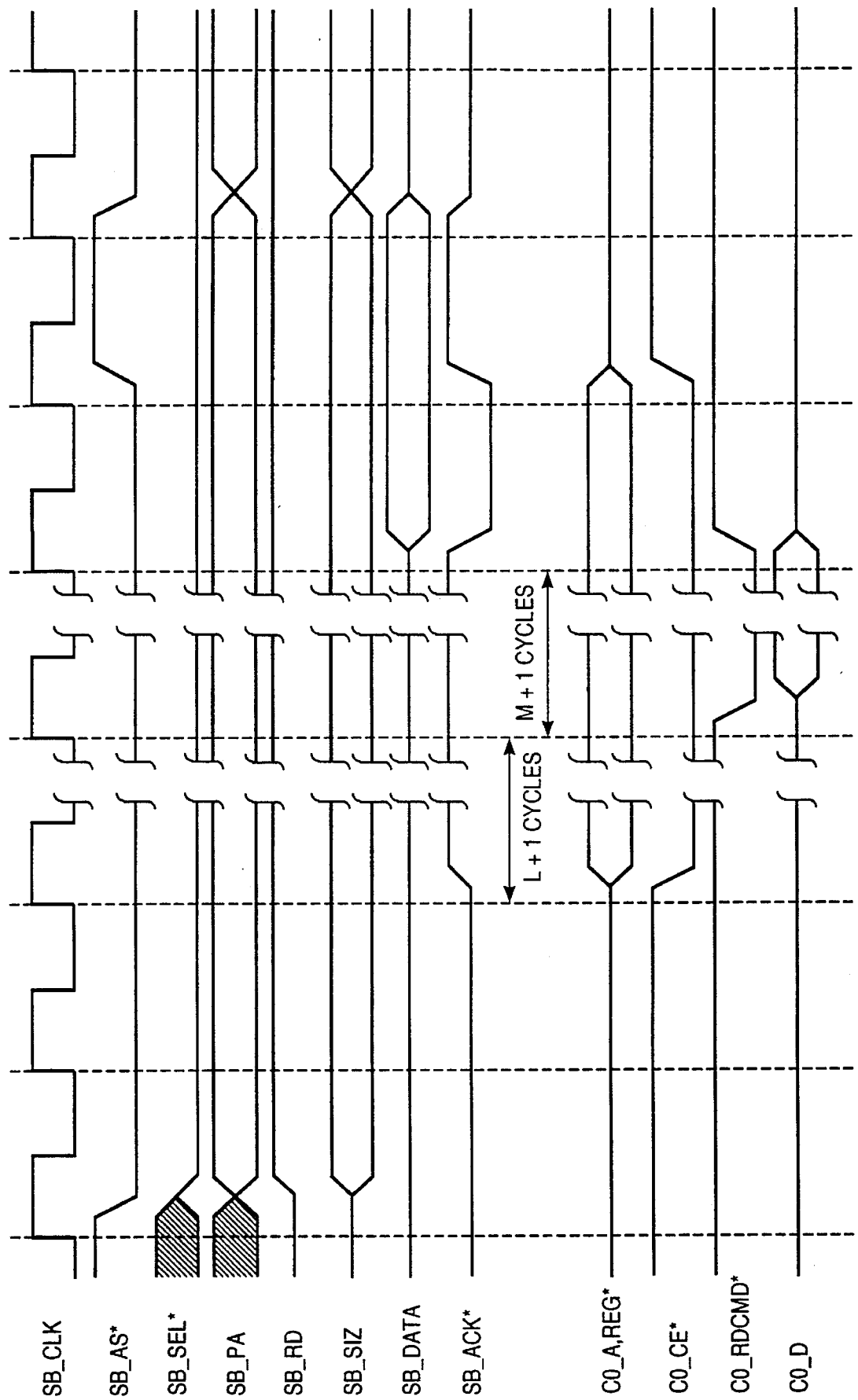
FIG. 9 illustrates a PC card read access of an attribute or common memory space.

Referring to the timing diagram of FIG. 9, a byte wide read initiated by computer 10 via adapter 100 of an attribute or common memory space on PC card 110 is illustrated. First, a base address value BASE stored in a corresponding Window Control Register of control and status register 102a and the offset address value on system bus address lines SB_PA are presented on card address lines C0_A thereby mapping the system bus address into a PC card address. Next, a card output enable line C0_CE* is asserted low. L+1 clock cycles later, L being the Command_Strobe_Delay value CMDDLY stored in the Window Control Register, a card output enable line C0_OE* (shown as C0_RDCMD* in FIG. 9) is asserted low. The selected PC card, i.e., PC card 110, then retrieves the requested memory data byte internally and presents the data value onto card data lines C0_D.
*Signal is active low.

After another M+1 clock cycles, where M is a Command_Strobe_Length value CMDLNG stored in the Window Control Register, the data byte value on card data lines COD is latched by adapter 100 and card output enable line C0_RDCMD* is de-asserted. One clock later, card output enable line C0_CE* is de-asserted. Finally, adapter 100 asserts a byte "ACK" on system bus line SB_ACK* for host computer 10, driving the latched data byte onto system bus data lines SB_DATA another clock cycle later, thereby completing the byte wide read cycle.
*Signal is active low.

A halfword wide attribute or common memory read of PC card 110 is as follows. First, the BASE value in the Window Control Register is applied onto card address lines C0_A, the offset address value on system bus address lines SB_PA is applied onto card address lines C0_A, and card enable line C0_CE* is asserted low. L+1 clock cycles later, card output enable line C0_OE* (shown as C0_RDCMD* in FIG. 9) is asserted low. Selected PC card 110 then presents the corresponding memory data bytes onto card data lines C0_D. After M+1 clock cycles, the valid data bytes on card data lines C0_D are latched into adapter 100 and card enable line C0_OE* (see C0_RDCMD*) is then de-asserted. One clock cycle later, card enable line C0_CE* is de-asserted. Adapter 100 asserts a halfword ACK onto system bus line SB_ACK* and drives the latched data byte-swapped onto system bus data lines SB_DATA, thereby completing the halfword read cycle.
*Signal is active low.

A word wide attribute or common memory read of PC card 110 is similar to the halfword read access up to and including the assertion of the halfword ACK back to host computer 10. The halfword ACK on system bus 55 informs host computer 10 that the word read requires sizing. As such, computer 10 must initiate another access via system bus 55 to read the other halfword of the desired word of data. The second read cycle of the second halfword occurs in the same manner with the exception that the value on system bus address line SB_PA [1] and also card address line C0_A [1] are now both "1" instead of "0", so that the appropriate next halfword of data is fetched.

Figure 10:
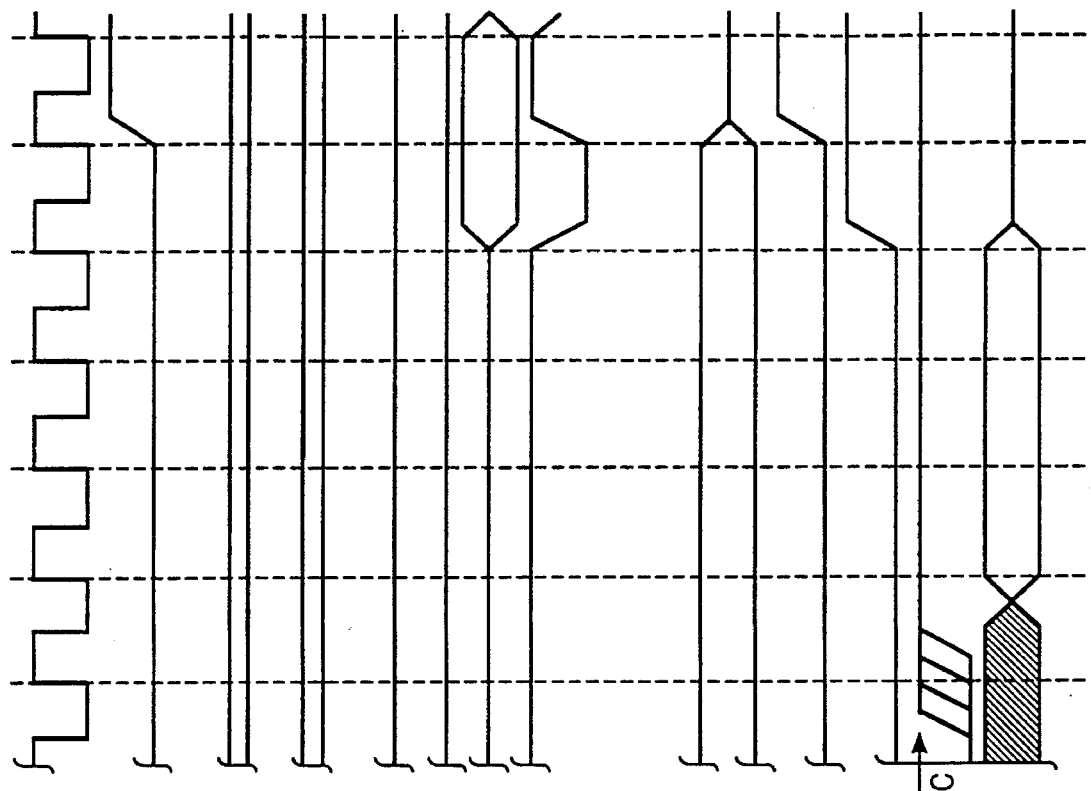
FIG. 10 illustrates a PC card read access of an attribute or common memory space with the WAIT feature.
Figure 10:
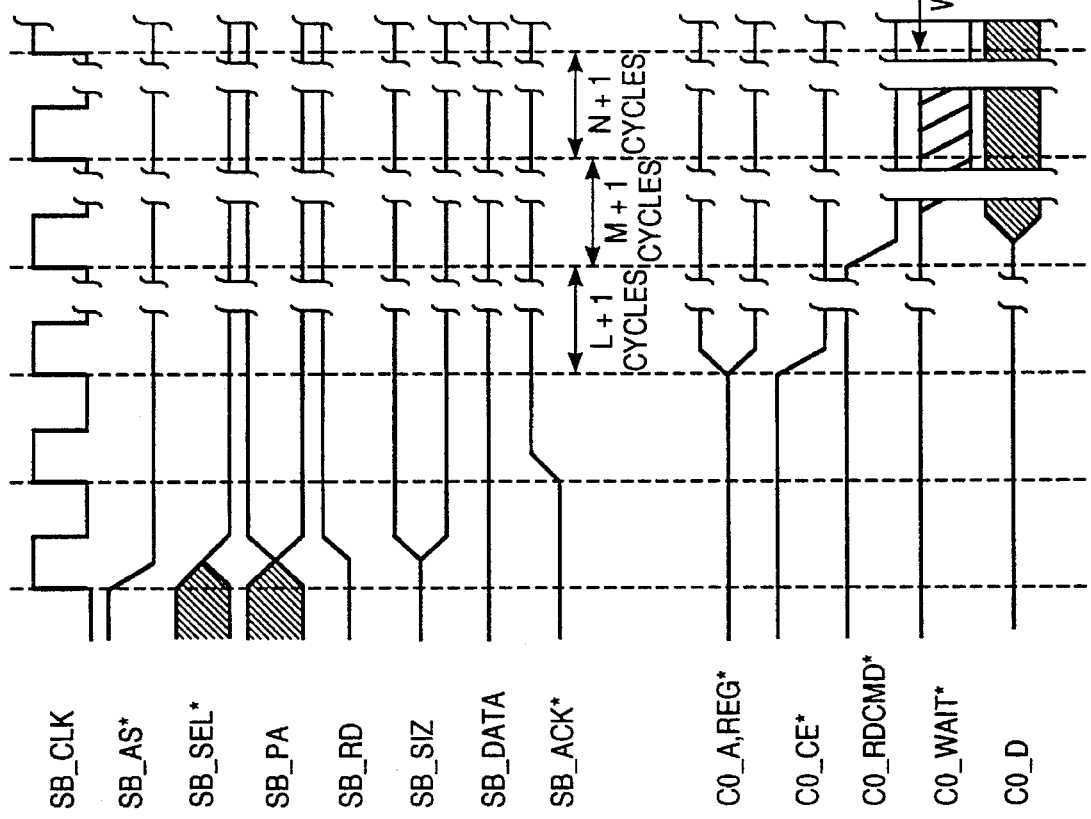

As discussed earlier, the PCMCIA specification was originally developed for external RAM memory cards. However, as other slower storage mediums, e.g., hard disk drives, were physically shrunk to fit the PCMCIA form factors, it became necessary to enhance the PCMCIA specification to support another mode of operation, i.e., accessing PC card 110 using a "WAIT" feature. In this embodiment, the WAIT feature enables adapter 100 to allow a slow PC card 100 to delay responding to an access by assert a card wait signal C0_WAIT*, as illustrated by FIG. 10.
*Signal is active low.

When host computer 10 initiates a read access to PC card 110 which utilizes card wait line C0_WAIT*, (a wait_request bit WAITREQ is enabled in the Window Control Register), the BASE value and the offset address value on system bus address lines SB_PA are is applied onto card address lines C0_A, and card enable line C0_CE* is asserted low. L+1 clock cycles later, card output enable line C0_OE* (shown as C0_RDCMD* in FIG. 10) is asserted low.
*Signal is active low.

M+N+2 clock cycles later, N equal to a Wait_Delay value WAITDLY in the Window Control Register, adapter 100 samples card wait line C0_WAIT*. If card wait line C0_WAIT* is asserted PC card 110 requires a delay in the completion of the memory access. The PCMCIA specification permits card wait line C0_WAIT* to be asserted for a maximum of 12 microseconds. Since the rising edge of card wait line C0_WAIT* is asynchronous with respect a system clock of host computer 10, when PC card 110 de-asserts card wait line C0_WAIT*, adapter 100 has to synchronize incoming card wait line C0_WAIT*.
*Signal is active low.

Next, PC card 110 asserts the requested memory data bytes onto card data lines C0_D before de-asserting card wait line C0_WAIT*. Adapter 100 latches the data and de-asserts card output enable line C0_OE* (see C0_RDCMD* of FIG. 10). One clock cycle later, card enable line C0_CE* is de-asserted. Finally, adapter 100 asserts an "ACK" on system bus line SB_ACK* and a clock cycle later, presents the latched data onto system bus data lines SB_DATA.
*Signal is active low.

A non-wait byte I/O read access of PC card 110 is similar to that of the byte read of an attribute or common memory described above with the exception that a card I/O ready line C0_IORD* (shown as C0_RDCMD* in FIG. 10) is asserted low instead of card output enable line C0_OE*. Similarly, a halfword I/O read access begins as in the halfword read of attribute or common memory with the exception that card line C0_IORD* (see C0_RDCMD*) is used instead of card enable line C0_OE*.
*Signal is active low.

If PC card 110 is capable of performing a 16-bit I/O access, card 110 asserts a card I/O_is16_bit line IOIS16 (not shown) low during the read access, and both bytes of data are presented onto card data lines C0_D, i.e., all 16 data bit lines are valid. Adapter 100 then generates a halfword ACK to host computer 10 via system bus line SB_ACK* and presents the latched data byte-swapped onto system bus data lines SB_DATA a clock cycle later.
*Signal is active low.

Conversely, if PC card 110 is only capable of byte sized I/O read access, card 110 does not assert card line IOIS16* low during the read access, and only the data byte presented on the responding 8 bits of card data lines C0_D are valid. Next, adapter 100 asserts a byte ACK to host computer 10 via system bus line SB_ACK* thereby indicating that the halfword I/O access requires sizing. Host computer 10 then initiates another I/O access on system bus 55 to read the second byte in order to complete the halfword I/O access.
*Signal is active low.

An I/O read of PC card 110 with the WAIT feature is also similar to the read access of an attribute or common memory with the WAIT feature, with the exception that card I/O ready line C0_IORD* (shown as C0_RDCMD* in FIG. 10) is asserted low instead of card line C0_OE*. The PCMCIA specification permits a maximum of 12 microseconds delay between the beginning and end of a read access. However, PC card 110 can delay completion of the read access beyond the 12 microseconds by using card line C0_WAIT*, requiring adapter 100 to support split reads on system bus 55. Once a read is initiated by host computer 10 on system bus 55, a rerun ACK is asserted by adapter 100 if a time out occurs while card wait line C0_WAIT* is asserted by PC card 110. The split read access is completed during a subsequent read retry by host computer 10 on system bus 55. Next, PC card 110 de-asserts card wait line C0_WAIT* with the read data is presented system bus data lines SB_DATA.

*Signal is active low.

Conversely, if PC card 110 asserts but fails to de-assert card wait line C0_WAIT* within the 20 microseconds during a read access cycle, adapter 100 terminates the read access cycle and generates an interrupt on system bus 55. The interrupt signals to host computer 10 that a WAIT time-out has occurred.
*Signal is active low.

Figure 11:
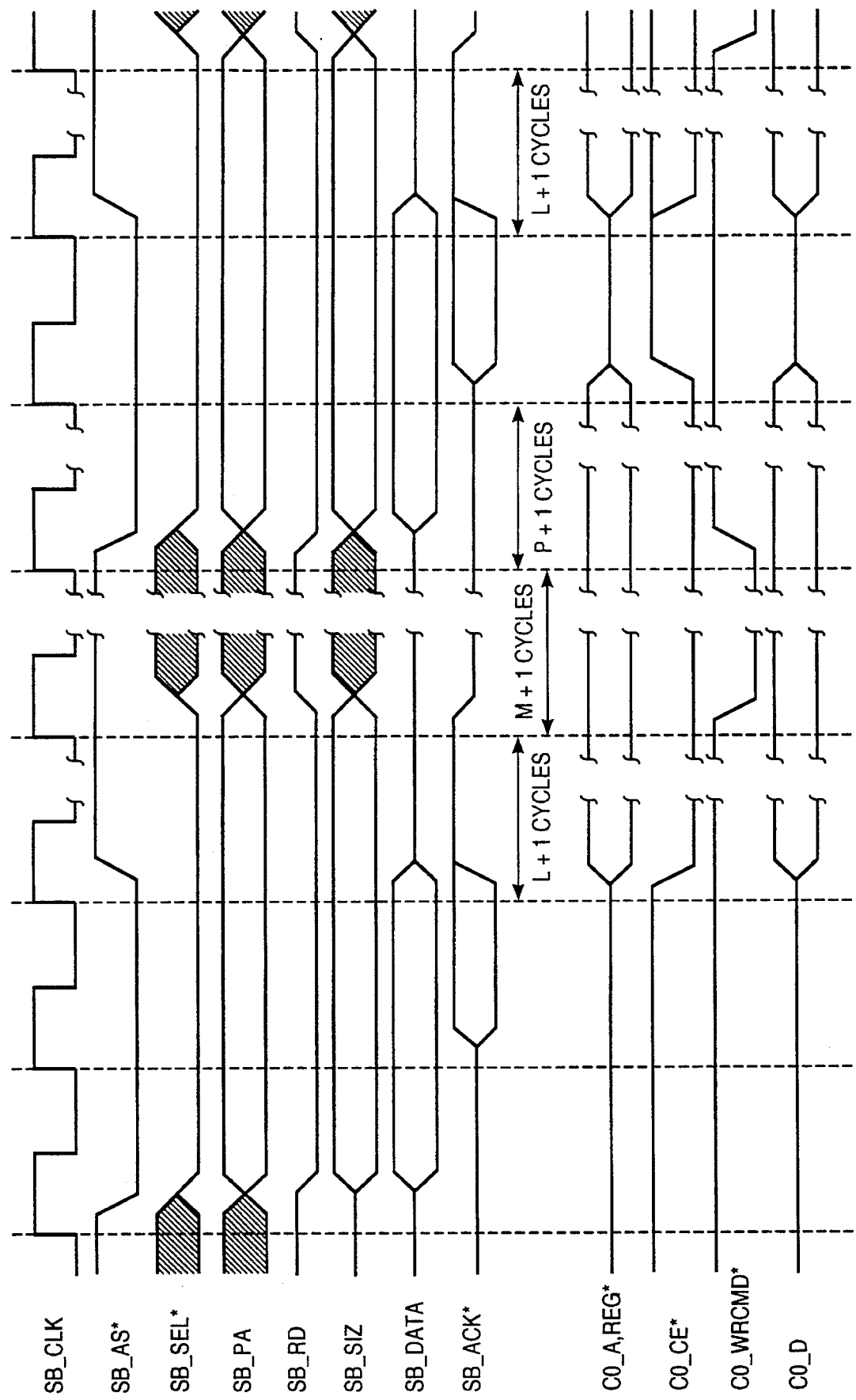
FIG. 11 illustrates a PC card write access of an attribute or common memory space.

In accordance with this embodiment of the invention, adapter 100 also supports non-WAIT byte, halfword and word data write accesses on PC card 110, as illustrated in the timing diagram of FIG. 11. Adapter 100 has a 16-bit wide data interface with system bus 55 and with external sizing performed by host computer 10 for word-size write accesses using halfword ACKs. As discussed above when computer 10 initiates a write access at an attribute or common memory or I/O address space, card select line C0_REG* is asserted low.
*Signal is active low.

When a byte write of PC card 110 attribute or common memory is initiated by computer 10, the BASE address value and the offset address value from system bus address lines SB_PA are presented onto card address lines C0_A, the data value on system bus data lines SB_DATA is driven onto card data lines C0_D, and card output enable line C0_CE* is asserted low. Next, adapter 100 asserts a byte ACK thereby terminating the write cycle on system bus 55. L+1 clock cycles later, card write enable line C0_WE* (shown as C0_WRCMD* in FIG. 11) is asserted low. After M+1 clock cycles, card write enable line C0_WE* is de-asserted low. P+1 clock cycles later, P equal to Recovery_delay value RECDLY, card output enable line C0_CE* is de-asserted.
*Signal is active low.

When a halfword (16-bits) wide write of attribute or common memory is initiated, the value of the BASE address value and the offset address value on system bus address lines SB_PA are presented on card address lines C0_A, the data value on system bus data lines SB_DATA is byte-swapped before being presented onto card data lines C0_D, and card enable line C0_CE* is asserted low. Next, adapter 100 asserts a halfword ACK on system bus line SB_ACK*, thereby terminating the write cycle on system bus 55. L+1 clock cycles later, card write enable line C0_WE* (shown as C0_WRCMD* in FIG. 11) is asserted low. After M+1 clock cycles card, write enable line C0_WE* is de-asserted. Finally, P+1 clock cycles later, card enable line C0_CE* is de-asserted.
*Signal is active low.

The sequence of events required for initiating a word sized write of Attribute/Memory is similar to that of a halfword write of PC card 110. The difference being that adapter 100 asserts a halfword ACK terminating the system bus write cycle, thereby informing host computer 10 that sizing is required to complete the word-size write access. Computer 10 responds by initiating a write of the second halfword of data over system bus 55.

Figure 12:
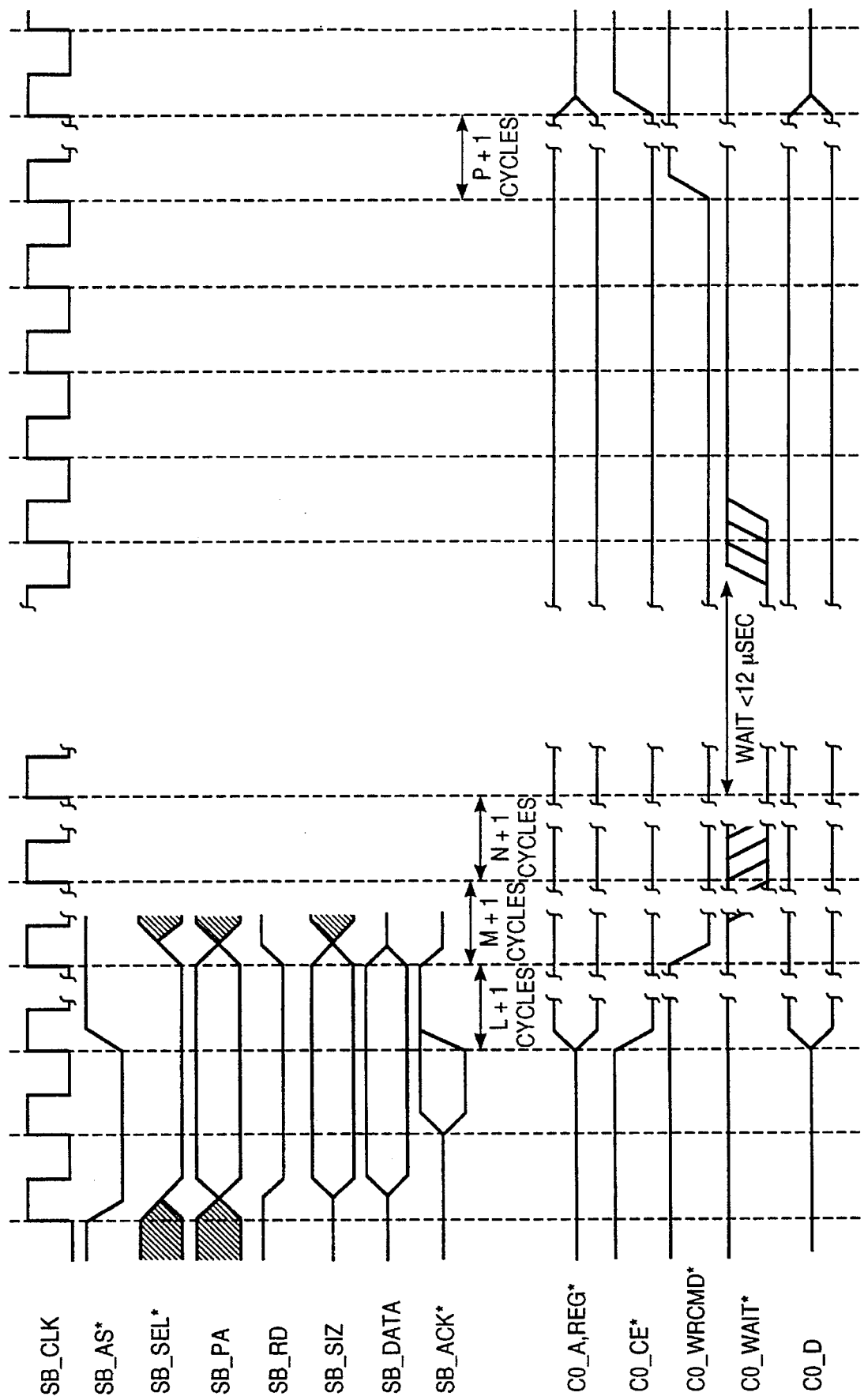
FIG. 12 illustrates a PC card write access of an attribute or common memory space with the WAIT feature.

Referring to the timing diagram of FIG. 12, adapter 100 also supports data write accesses to attribute or common memory of PC card 110 using the WAIT feature. When a write access is initiated at PC card 110 which utilize card wait line C0_WAIT*, the BASE address value and the offset address value on system bus lines SB_PA are presented on card address lines C0_A, the data value on system bus data lines SB_DATA is driven onto card data lines C0_D, and card enable signal C0_CE* is asserted low. Adapter 100 then sends an appropriate ACK, i.e., byte ACK for byte write and halfword ACK for halfword or word write, thereby terminating the system bus write cycle.
*Signal is active low.

L+1 clock cycles later, card enable line C0_WE* (shown as C0_WRCMD* in FIG. 12) is asserted low. M+N+2 clock cycles later, card wait line C0_WAIT* is sampled. If card wait line C0_WAIT* is equal to "0", card 110 is requesting a delay in the completion of the memory access. As discussed earlier, the PCMCIA specification permits a maximum wait period of 12 microseconds. When PC card 110 de-asserts card wait line C0_WAIT*, adapter 100 de-asserts card write enable line C0_WE* (see C0_WRCMD*). P+1 clock cycles later, card enable line C0_CE* is de-asserted.
*Signal is active low.

Figure 13:
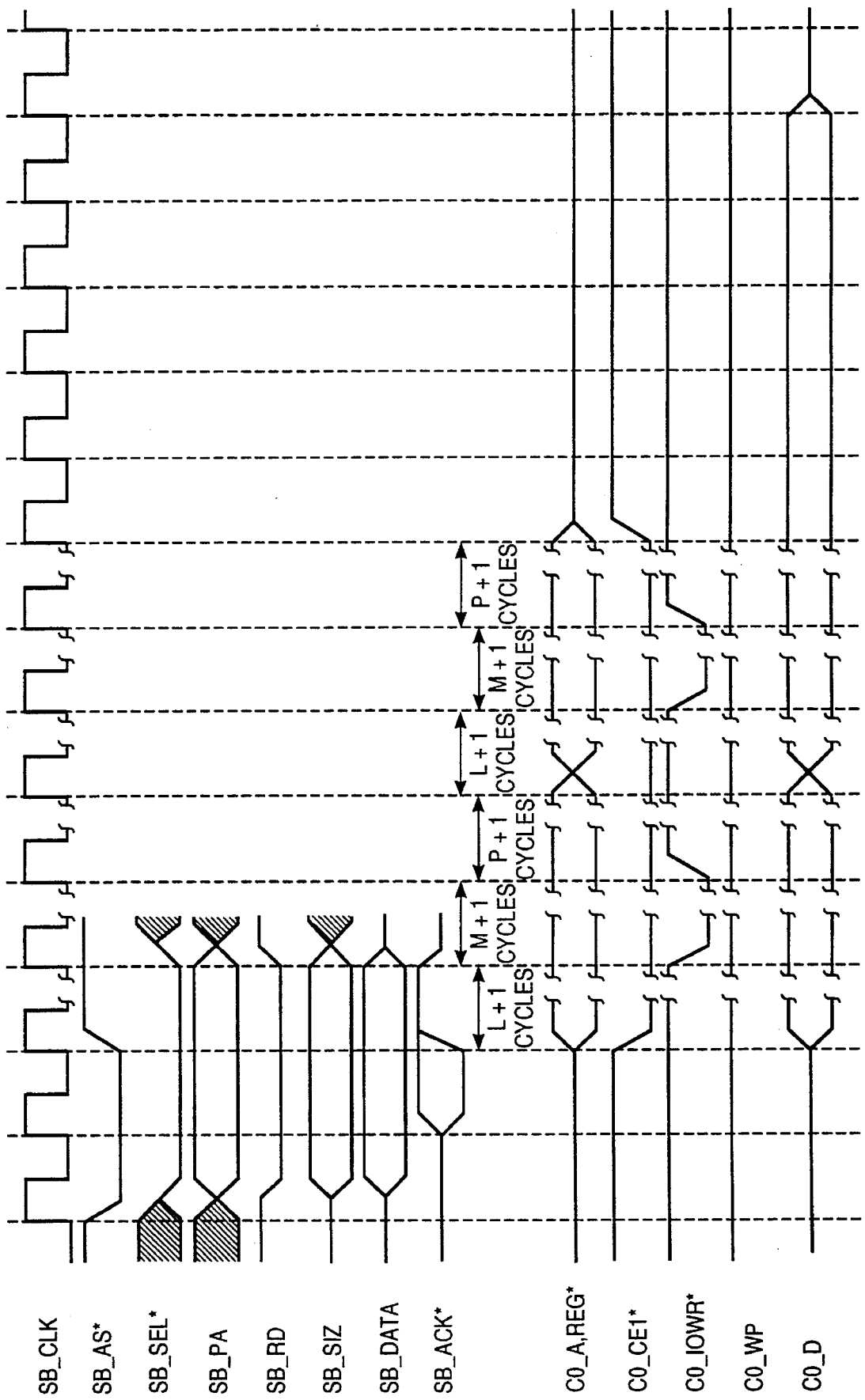
FIG. 13 illustrates a PC card write access of an I/O space with byte sizing, but without the WAIT feature.

In this embodiment, adapter 100 also supports non-WAIT I/O write accesses of PC card 110 with byte sizing, as illustrated by the timing diagram of FIG. 13. A byte I/O write access of PC card 110 is similar to that of a byte write of attribute or common memory with the exception that a card I/O write line C0_IOWR* (shown as C0_WRCMD* in FIG. 13) is asserted instead of card write enable line C0_WE*. Similarly, a half I/O write accesses of PC card 110 begin as in the halfword write of attribute or common memory with the exception that card I/O write line C0_IOWR* (see C0_WRCMD*) is asserted instead of card write enable line C0_WE*.
*Signal is active low.

As discussed above, PC card 110 is configured for I/O type operations by loading the appropriate Card Information Structure (CIS) into optional Configuration Registers located at the base of the PCMCIA common address space. The I/O access protocol is similar to common memory access protocol except that card I/O lines C0_IORD* (shown as C0_RDCMD* in FIG. 9) and C0_IOWR* (see FIG. 13) are used for handshaking instead of card enable lines C0_OE* and C0_WE*, respectively (shown as C0_RDCMD* and C0_WRCMD* in FIGS. 9, 11, respectively).
*Signal is active low.

Referring again to FIG. 13, PC card 110 asserts card line IOIS16* low (not shown) to indicate that card 110 is also capable of executing a 16 bit wide write. In response, adapter 100 asserts card enable line C0_CE1* low so that both bytes of data presented on card data fines C0_D are written into PC card 110.
*Signal is active low.

Conversely, if PC card 110 does not assert line IOIS16* (not shown) low during the I/O write access, i.e., PC card 110 is not capable of performing a 16 bit I/O write, only card enable line C0_CE1* is asserted low so that only the even byte presented on card data lines C0_D from system bus data lines SB_DATA is written into PC card 110. Adapter 100 then completes the halfword I/O write cycle by executing one more I/O byte write to PC card 110 as described above. This second byte I/O write access differs from the first byte write in that card address line C0_A[0] is set to "1" and the odd byte value from system bus data lines SB_DATA is presented onto card data lines C0_D.
*Signal is active low.

Adapter 100 also supports I/O write access of PC card 110 with the WAIT feature. Referring back to FIG. 11, the sequence of events for I/O write access with the WAIT feature is similar to that for write access of attribute or common memory with the WAIT feature, with the exception that card I/O write enable line C0_IOWR* (shown as C0_WRCMD* in FIG. 11 ) is asserted instead of card write enable line C0_WE* during an I/O write access. If PC card 110 asserts but falls to de-assert card wait line C0_WAIT* within 20 microseconds, the I/O write access is terminated and card 110 generates a status change interrupt (SCINT) to host computer 10 with PC card access time-out (PCTO) bits set in the Interface Status Register, indicating that a WAIT time-out has occurred.
*Signal is active low.

Appendix B is a detailed data sheet for one embodiment of adapter 100 and is incorporated herein. Appendix C are verilog files of this embodiment and is also incorporated herein.

As discussed above, PCMCIA socket 107 can be configured either to operate in attribute/common memory mode or I/O mode depending on the capability of PC card 110. When PCMCIA socket 107 and is configured for attribute/common memory mode, adapter 100 generates a card status change interrupt whenever adapter 100 detects any of the following events:

PC card access time-out
PC card write protect status change
PC card ready-busy* status change
PC card battery status change
PC card is inserted or removed
*Signal is active low.

Conversely, when PCMCIA socket 107 is configured for I/O mode, adapter 100 generates a card status change interrupt whenever adapter 100 detects the following events:

PC card access time-out
PC card is inserted or removed
PC card generates a status change interrupt The interrupts generated by adapter 100 provides a variety of functions. For example, when PC card 110 is configured as an I/O card, PC card 110 generates a status change interrupt to host computer 10 by asserting a card status change line STSCHG* (not shown) whenever a change in card status is detected. Adapter 100 detects card status line STSCHG* and in turn generates an interrupt over system bus 55 to computer 10. Host computer 10 reads the Pin Replacement Register on (I/O type) PC card 110 to determine the source of the PC card status change interrupt. Each source of the card status change interrupt is individually maskable by adapter 100 and is available on system bus interrupt request line SB_INT[0]. Subsequently, the card status change interrupt is cleared by host computer 10 by writing a "1" to the corresponding status change bit in the Interface Status Register 0.
*Signal is active low.

As discussed above, this embodiment also includes hardware which supports PC card hot-plugging. Referring back to FIG. 6, adapter 100 provides control signals to a power switch 105 for applying and removing one of two power sources Vcc, Vpp to and from PC card 110. Such an arrangement enables PC card 110 to be hot-plugged, i.e., safely connected to or disconnected from socket 107 of adapter 110, without powering down host computer 10 by continuously monitoring the presence and absence of PC card 110 with respect to PCMCIA socket 107 in the following manner.

When host computer 10 is first powered up, adapter 100 does not provide power to PCMCIA socket 107. Instead, upon detecting the existence of PC card in socket 107 during the power-up sequence, or detecting a subsequent insertion of PC card 110 after the power-up sequence, a power switching circuit 105 begins to provide power to PC card 110 by turning on the appropriate power MOSFETs of switching circuit 105. Conversely, when adapter 100 is interrupted and informed of the removal of PC card 110, adapter 100 sends the appropriate signal via Card_0_Pwr_Cntl line which causes power switching circuit 105 to turn off the appropriate power MOSFETs, thereby removing power from PCMCIA socket 107.

In some embodiments, PC card 110 is a mass storage or network device, and PROM 106 is configured to boot host computer 100 using boot images stored in or retrieved over a network connection by PC card 110. PROM 106 also contains a separate CIS interpreter for identifying tuples which provide device identification and configuration information for PC cards, e.g., card 110, during booting. The PROM resident CIS interpreter then builds a device information tree with at least one device information node for each PC card, e.g., PC card 110. In addition, PROM 106 contains information defining the capabilities and system resources of adapter 100. For more information on auto-boot process, see U.S. patent application, Ser. No. 07/842,007, entitled "METHOD AND APPARATUS FOR BOOTING A COMPUTER SYSTEM", filed Feb. 25, 1992, incorporated herein by reference in its entirety.

In another embodiment, a 5 volt to 12 volt DC—DC converter 107 provides the higher voltage required by some PC cards for operation, thereby further increasing the versatility of adapter 100. As such, after power is provided to card 110, adapter 100 reads the card information structure (CIS) located in the attribute memory space of card 110, to obtain information about PC card 110, thereby ensuring that PC card 110 is of the type that adapter 100 is able to support. In yet another embodiment, a test port provides internal diagnostics for adapter 100.

The PCMCIA specification Version 2.1 does not support direct memory access (DMA) type operations, and hence data transfers between host computer 10 and PC card 110 are essentially programmed I/O type operations. However, should a later version of the PCMCIA specification support DMA, one skilled in the an will be able to add DMA capability to adapter 100 and make the appropriate modifications to software driver 34, enabling host computer 10 to initiate data transfers between host memory 30 and PC card 110 independent of host CPU 20 after an initial setup.

While the invention has been described using specific embodiments, other embodiments, alternatives and modifications will be apparent to those skilled in the art without deviating from the scope and spirit of the invention. For example, the PCMCIA interface of the present invention may be implemented in varying proportions of hardware and software. Hence, the above description is merely illustrative and not intended to be limiting. The true scope of the invention is indicated by the following claims.

What is claimed is:

1. A PCMCIA interface apparatus for providing access between a user application running on a host computer and a PC card coupled to said host computer via a PCMCIA adapter, said interface comprising:

a hardware-independent PC card driver for generating an appropriate card service request with a device information pointer (DIP) corresponding to said PC card in response to an external PCMCIA access request from said host computer;

a hardware-independent card services layer coupled to said PC card driver for processing said card service request and for invoking a hardware-independent nexus driver;

a hardware-independent nexus driver for generating an internal PCMCIA access request in response to the card services layer;

a hardware-dependent adapter driver coupled to said hardware-independent nexus driver for processing said internal PCMCIA access request and for causing a corresponding system signal to be generated by said host computer to said PCMCIA adapter;

a PCMCIA adapter coupled between said system bus and said PC card for converting said system bus signal into a PC card signal for said PC card.

2. The PCMCIA interface of claim 1 wherein said PCMCIA adapter includes a PCMCIA socket associated with said PC card, and said adapter driver includes a pointer to a driver apparatus structure for storing a configuration of said PCMCIA adapter, and wherein said card services layer also processes a socket services request associated with said PCMCIA socket.

3. The PCMCIA interface of claim 2 further including a hardware-independent events manager coupled to said PCMCIA nexus driver for detecting an unsolicited PCMCIA event associated with said PC card, thereby enabling said nexus driver to notify said user application by generating an unsolicited event report to said user application.

4. The PCMCIA interface of claim 3 wherein said unsolicited PCMCIA event is an insertion of said PC card into said PCMCIA socket.

5. The PCMCIA interface of claim 1 wherein said card services layer includes a card information structure (CIS) interpreter for parsing a tuple from a CIS which includes self-identifying information of said PC card.

6. The PCMCIA interface of claim 1 wherein said host computer is a SPARC based computer system.

7. The PCMCIA interface of claim 6 wherein said host computer is coupled to said PCMCIA adapter via a SPARC based SBus.

8. The PCMCIA interface of claim 1 wherein said host computer is a UNIX based computer system.

9. A method of providing access between a user application running on a host computer and a PC card coupled to said host computer via a PCMCIA adapter, said method comprising the computer implemented steps of:

generating a card service request with a device information pointer (DIP) corresponding to said PC card in response to an external PCMCIA access request from said host computer;

processing said card service request and invoking a hardware-independent nexus driver which generates an internal PCMCIA access request in response to said card service request;

processing said internal PCMCIA access request and causing a corresponding system signal to be generated by said host computer to said PCMCIA adapter;

generating a system bus signal on said system bus in response to said internal PCMCIA access; and converting said system bus signal into a PC card signal in response to said system bus signal.

10. The method of claim 9 wherein said PCMCIA adapter includes a PCMCIA socket associated with said PC card, said method further including the steps of:

storing a configuration of said PCMCIA adapter; and processing a socket services request associated with said PCMCIA socket.

11. The method of claim 9 further comprising the computer implemented steps of:

detecting an unsolicited PCMCIA event associated with said PC card; and notifying said user application by generating an unsolicited event report to said user application.

12. The method of claim 9 further comprising the computer implemented step of parsing an information tuple from a card information structure (CIS) which includes self-identifying information of said PC card.

13. The method of claim 9 wherein said host computer is coupled to said PCMCIA adapter via a SPARC based SBus and the step of generating said system signal includes the step of generating an SBus signal.

\* \* \* \* \*